US008761113B2

(12) United States Patent
Zhang et al.

(10) Patent No.: US 8,761,113 B2
(45) Date of Patent: Jun. 24, 2014

(54) USER EQUIPMENT, METHOD FOR DETERMINING RESOURCE, METHOD FOR REPORTING RESOURCE, AND SYSTEM FOR DISTRIBUTING RESOURCE

(71) Applicant: Huawei Technologies Co., Ltd., Shenzhen (CN)

(72) Inventors: Yi Zhang, Shanghai (CN); Jie Ma, Beijing (CN); Haidan Wang, Shanghai (CN); Chuanfeng He, Beijing (CN); Cunfei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/728,231

(22) Filed: Dec. 27, 2012

(65) Prior Publication Data
US 2013/0136077 A1 May 30, 2013

Related U.S. Application Data

(63) Continuation of application No. 13/156,613, filed on Jun. 9, 2011, which is a continuation of application No. PCT/CN2009/075247, filed on Dec. 1, 2009.

(30) Foreign Application Priority Data

Dec. 10, 2008 (CN) .......................... 2008 1 0219859

(51) Int. Cl.
*H04W 4/00* (2009.01)
(52) U.S. Cl.
USPC ........... 370/329; 370/230; 370/328; 370/331; 370/338; 370/229; 370/252
(58) Field of Classification Search
None
See application file for complete search history.

(56) References Cited

U.S. PATENT DOCUMENTS 6,081,697 A * 6/2000 Haartsen .................. 455/109
2004/0219920 A1 11/2004 Love et al.
(Continued)

FOREIGN PATENT DOCUMENTS

CN 1536794 A 10/2004
CN 1622657 A 6/2005
(Continued)

OTHER PUBLICATIONS

3GPP TSG-WG2 Meeting #64, "Change Request", R2-086121, Nov. 2008, 2 pages.
(Continued)

Primary Examiner — Ian N Moore
Assistant Examiner — Eric H Wang
(74) Attorney, Agent, or Firm — Staas & Halsey LLP

(57) ABSTRACT

A User Equipment (UE), a method for determining a resource, a method for reporting a resource, and a system for distributing a resource are provided. The method for determining a resource includes: if transmission data on the carrier reaches maximum transmission data supported in a scope allowed by Service Grant (SG), and a transmission power of the UE is capable of improving a data transmission rate of the carrier, and the carrier and the other one carrier of the dual carriers are incapable of completing transmitting total buffer status data in the same delay period, determining that a resource distributed to a UE on one carrier of dual carriers of the UE is insufficient; otherwise, determining that the resource distributed for the UE on the carrier is sufficient. Therefore, a solution for reporting the resource of the dual carriers is provided, so as to improve a network performance.

18 Claims, 5 Drawing Sheets

(56) References Cited

U.S. PATENT DOCUMENTS

| | | | |
|---|---|---|---|
| 2005/0265222 A1 | 12/2005 | Gerlach | |
| 2006/0176811 A1 | 8/2006 | Yang et al. | |
| 2006/0221894 A1 | 10/2006 | Casaccia et al. | |
| 2007/0109964 A1 | 5/2007 | Kwak et al. | |
| 2007/0147526 A1 | 6/2007 | Kim et al. | |
| 2007/0297360 A1 | 12/2007 | Joachim et al. | |
| 2008/0101288 A1 | 5/2008 | Wan | |
| 2009/0097444 A1* | 4/2009 | Lohr et al. | 370/329 |
| 2009/0270820 A1 | 10/2009 | Johnson et al. | |
| 2010/0111023 A1* | 5/2010 | Pelletier et al. | 370/329 |

FOREIGN PATENT DOCUMENTS

| | | |
|---|---|---|
| CN | 1694557 A | 11/2005 |
| CN | 1819674 | 8/2006 |
| CN | 1905549 A | 1/2007 |
| CN | 101114857 A | 1/2008 |
| CN | 101166054 A | 4/2008 |
| CN | 101176379 A | 5/2008 |
| CN | 101185260 A | 5/2008 |
| CN | 100425087 C | 10/2008 |
| CN | 101288247 A | 10/2008 |
| CN | 101651611 A | 2/2010 |
| CN | 101754394 B | 1/2012 |
| EP | 1971096 | 9/2008 |
| EP | 1986455 | 10/2008 |
| GB | 2448762 | 10/2008 |
| WO | 2007/003117 A1 | 1/2007 |

OTHER PUBLICATIONS

Extended European Search Report issued Sep. 7, 2012 in corresponding European Patent Application No. 09831447.9.

3GPP TS 25.321 V5.14.0, "3$^{rd}$ Generation Partnership Project; Technical Specification Group Radio Access Network; Medium Access Control (MAC) protocol specification," Release 5, Sep. 2008, pp. 1-58.

3GPP TS 25.321 V6.16.0, "3$^{rd}$ Generation Partnership Project; Technical Specification Group Radio Access Network; Medium Access Control (MAC) protocol specification," Release 6, Sep. 2008, pp. 1-94.

3GPP TS 25.321 V7.10.0, "3$^{rd}$ Generation Partnership Project; Technical Specification Group Radio Access Network; Medium Access Control (MAC) protocol specification," Release 7, Sep. 2008, pp. 1-147.

3GPP TS 25.321 V8.3.0, "3$^{rd}$ Generation Partnership Project; Technical Specification Group Radio Access Network; Medium Access Control (MAC) protocol specification," Release 8, Sep. 2008, pp. 1-167.

3GPP TS 25.321 V9.0.0, "3$^{rd}$ Generation Partnership Project; Technical Specification Group Radio Access Network; Medium Access Control (MAC) protocol specification," Release 9, Sep. 2008, pp. 1-187.

Written Opinion of the International Searching Authority mailed Mar. 11, 2010 in corresponding International Paten Application PCT/CN2009/075247.

Chinese Office Action issued May 5, 2011 in corresponding Chinese Patent Application 200810219859.6.

International Search Report, mailed Mar. 11, 2010, in International Application No. PCT/CN2009/075247 (4 pp.).

Office Action, dated Mar. 14, 2013, in corresponding U.S. Appl. No. 13/156,613 (38 pp.).

"*Dual Carrier EGPRS for GERAN evolution*"; AHGEV-009, 3GPP TSG GERAN adhoc on GERAN Evolution Meeting No. 1, Copenhagen, Denmark, May 18-19, 2005; pp. 1-7.

Extended European Search Report dated Dec. 16, 2013 in corresponding European Patent Application No. 13182712.3 (6 pages).

Chinese Search Report dated Oct. 25, 2013 in corresponding Chinese Patent Application No. 201210004148.3 (2 pages).

Chinese Office Action mailed Nov. 4, 2013 in corresponding Chinese Patent Application No. 201210004148.3 (3 pages).

U.S. Appl. No. 13/156,613, filed Jun. 9, 2011, Yi Zhang et al., Huawei Technologies Co., Ltd. Shenzhen, P.R. China.

Non-Final Office Action dated Apr. 10, 2014 in parent U.S. Appl. No. 13/156,613 (27 pages).

U.S. Final Office Action mailed Sep. 27, 2013 in parent U.S. Appl. No. 13/156,613 (21 pages).

U.S. Appl. No. 13/156,613, filed Jun. 9, 2011, Yi Zhang et al., Huawei Technologies Co., Ltd., Shenzhen, CN.

\* cited by examiner

USER EQUIPMENT, METHOD FOR DETERMINING RESOURCE, METHOD FOR REPORTING RESOURCE, AND SYSTEM FOR DISTRIBUTING RESOURCE

CROSS-REFERENCE TO RELATED APPLICATIONS

This application continuation of U.S. patent application Ser. No. 13/156,613, filed on Jun. 9, 2011, which is a continuation of International Application No. PCT/CN2009/075247 filed on Dec. 1, 2009. The International application claims priority to Chinese Patent Application No. 200810219859.6, filed on Dec. 10, 2008 all of which are hereby incorporated by reference in their entireties.

FIELD OF THE INVENTION

The present invention relates to the field of communications technologies, and in particular, to a User Equipment (UE), a method for determining a resource, a method for reporting a resource, and a system for distributing a resource.

BACKGROUND OF THE INVENTION

With the development of mobile communications technologies, the 3rd Generation (3G) technology is evolved continuously. High Speed Downlink Packet Access (HSDPA) technology and High Speed Uplink Packet Access (HSUPA) technology are important evolution of the 3G technology. The HSUPA implements high speed uplink data transmission through a series of key technologies, such as 10 ms/2 ms short frame, the physical layer using Hybrid Automatic Repeat reQuest (HARQ), and the quick scheduling to a UE by a Node Base (Node B).

In the HSUPA, Enhanced Dedicated Transport Channel (E-DCH) is used to bear user data, and the E-DCH is categorized into a scheduling E-DCH (configured to bear non-real-time services), and a non-scheduling E-DCH (configured to bear real-time services). As for the scheduling E-DCH, the scheduling grant at the network side determines when the UE may transmit data on the E-DCH. The scheduling grant information Absolute Grant (AG) and the scheduling grant information Relative Grant (RG) are borne respectively through an E-DCH Absolute Grant Channel (E-AGCH) and an E-DCH Relative Grant Channel (E-RGCH). Whether the network side delivers the grant AG or RG is determined by Scheduling Information (SI) reported by the UE and whether the network side is satisfied with a carrier resource distributed to the UE.

In the prior art, only a method for determining whether a resource distributed to a UE on a single carrier is sufficient under a condition of the single carrier is described, and after dual carriers are introduced, no specific solution for determining whether the resource distributed to the UE on the dual carriers is sufficient is given. With the wide application of the dual carriers, determining whether the resource distributed to the UE on the dual carriers is sufficient is a problem to be solved urgently.

SUMMARY OF THE INVENTION

Embodiments of the present invention provide a UE, a method for determining a resource, a method for reporting a resource, and a system for distributing a resource, and specifically provide a technical solution for determining whether a resource distributed to the UE on dual carriers is sufficient.

An embodiment of the present invention provides a method for determining a resource, where the method includes: if transmission data on the carrier reaches maximum transmission data supported in a scope allowed by Service Grant (SG), and a transmission power of the UE is capable of improving a data transmission rate of the carrier, and the carrier and the other one carrier of the dual carriers are incapable of completing transmitting total buffer status data in the same delay period, determining that a resource distributed to a UE on one carrier of dual carriers of the UE is insufficient; otherwise, determining that the resource distributed for the UE on the carrier is sufficient.

An embodiment of the present invention further provides a method for reporting a resource, where the method includes: determining that a resource distributed to a UE on one carrier of dual carriers of the UE is insufficient, if transmission data on the carrier reaches maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient; and reporting to a base station whether the resource distributed on the dual carriers is sufficient.

Accordingly, an embodiment of the present invention further provides a UE, where the UE includes: a judging module, configured to respectively judge whether transmission data on each carrier of dual carriers of the UE reaches maximum transmission data supported in a scope allowed by SG, respectively judge whether a transmission power of the UE is capable of improving a data transmission rate of each carrier of the dual carriers, and jointly judge whether each carrier of the dual carriers is incapable of completing transmitting total buffer status data in the same delay period; and a determining module, configured to determine that a resource distributed to the UE on one carrier of the dual carriers of the UE is insufficient, if a judgment result of the judging module is that the transmission data on the carrier reaches the maximum transmission data supported in the scope allowed by the SG, the transmission power of the UE is capable of improving the data transmission rate of the carrier, and the carrier and the other one carrier of the dual carriers are incapable of completing transmitting the total buffer status data in the same delay period; otherwise, determine that the resource distributed for the UE on the carrier is sufficient.

An embodiment of the present invention further provides a system for distributing a resource, where the system includes: a UE, configured to judge whether a resource distributed to the UE on each carrier of dual carriers is sufficient, and report to a base station whether a resource distributed on the dual carriers is sufficient; and a base station, configured to distribute a resource for a corresponding carrier according to content reported by the UE.

According to the embodiments of the present invention, it is determined whether a resource distributed on each carrier is sufficient by judging whether each carrier of dual carriers satisfies relevant conditions. Furthermore, a determination result is reported to a base station, so that the base station determines to distribute a resource for one or two carriers having the insufficient resource of the dual carriers according to the determination result, so as to improve a network transmission performance.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

Embodiments of the present invention provide a UE, a method for determining a resource, a method for reporting a resource, and a system for distributing a resource, and specifically provide a technical solution for determining whether a resource distributed to the UE on dual carriers is sufficient, so as to improve a network transmission performance.

Figure 1:
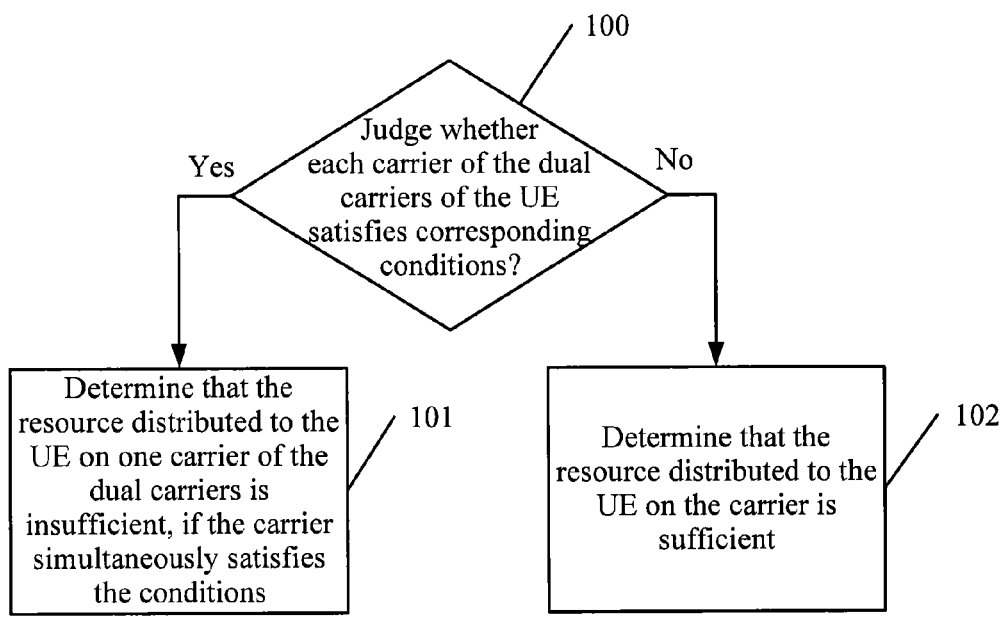
FIG. 1 is a schematic flow chart of an embodiment of a method for determining a resource according to the present invention.

Referring to FIG. 1, it is a schematic flow chart of an embodiment of a method for determining a resource according to the present invention.

The method according to this embodiment includes: determining that a resource distributed to a UE on one carrier of dual carriers of the UE is insufficient, if transmission data on the carrier reaches maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient.

Step 100: Judge whether each carrier of the dual carriers of the UE satisfies the following conditions:

the transmission data on the carrier reaches maximum transmission data supported in the scope allowed by the SG;

the transmission power of the UE is capable of improving the data transmission rate of the carrier; and the carrier and the other one carrier of the dual carriers are incapable of completing transmitting the total buffer status data in the same delay period.

Step 101: If one carrier of the dual carriers simultaneously satisfies the above conditions, determine that the resource distributed to the UE on the carrier is insufficient otherwise, step 102 is performed.

Step 102: Determine that the resource distributed to the UE on the carrier is sufficient.

In specific implementation, judgments for the three conditions have no precedence order, and as long as one condition is not satisfied, it is determined in step 102 that the resource distributed to the UE on the carrier is sufficient; and only when the three conditions are simultaneously satisfied, it is determined in step 101 that the resource distributed to the UE on the carrier is insufficient.

The method for determining a resource according to the embodiment of the present invention may determine whether the resource distributed to the UE on the dual carriers is sufficient, so as to enable a base station to distribute the resource for one or two carriers having the insufficient resource of the dual carriers according to a determination result, so as to improve a network transmission performance.

According to the embodiment, when it is determined whether the resource distributed on each carrier of the dual carriers is sufficient, the three conditions to be satisfied are described. Here, the condition that "the transmission data on the carrier reaches maximum transmission data supported in the scope allowed by the SG" is defined as condition 1, the condition that "the transmission power of the UE is capable of improving the data transmission rate of the carrier" is defined as condition 2, and "the carrier and the other one carrier of the dual carriers are incapable of completing transmitting the total buffer status data in the same delay period" is defined as condition 3. In a specific embodiment, the judgments for satisfying the conditions 1, 2, and 3 have no precedence order, and as long as one of the conditions is not satisfied, other conditions are not judged, and it is directly determined that the resource distributed to the UE on the carrier is sufficient.

A procedure for judging whether each carrier of the dual carriers satisfies each condition is described in detail below with reference to the accompanying drawings.

When the condition 1 is judged, two carriers of the dual carriers are respectively judged, that is, it is judged whether the transmission data on each carrier reaches the maximum transmission data supported in the scope allowed by the SG More specifically, it is judged whether data selected by E-DCH Transport Format Combination (E-TFC) currently transmitted by each carrier reaches maximum transmission scheduling data supported in the scope allowed by the SG Furthermore, when a carrier is an inactive status, the carrier may also be regarded to satisfy the condition 1. As for a carrier satisfying the condition 1, it is necessary to judge whether the carrier satisfies the conditions 2 and 3; and as for a carrier not satisfying the condition 1, it is determined that the resource distributed on the carrier is sufficient.

When the condition 2 is judged, judgment results for the two carriers of the dual carriers may be different. In one aspect, as for each carrier, when transmitted minimum Radio Link Control Protocol Data Unit size (RLC PDU size) data is increased, an increased transmission power is different; in another aspect, when a carrier reaches a maximum E-DCH Transport Format Combination Indicator (E-TFCI) supported by the UE, the other one carrier does not reach the E-TFCI. Both the two situations may cause inconsistent judgment results of the two carriers in the condition 2; and therefore, an embodiment of the present invention provides a determination method for the condition 2.

When it is judged whether the dual carriers satisfy the condition 2, the following situations exist. Firstly, it is directly judged whether the condition 2 is satisfied; secondly, it is judged whether the condition 1 is satisfied first; thirdly, it is judged whether the condition 3 is satisfied first; and fourthly, it is judged whether the conditions 1 and 3 are satisfied first.

In the following embodiments, it is presumed that it is judged whether the condition 1 is satisfied before it is judged whether the dual carriers satisfy the condition 2, and the following processing manners exist according to the judgment result of the condition 1.

Figure 2:
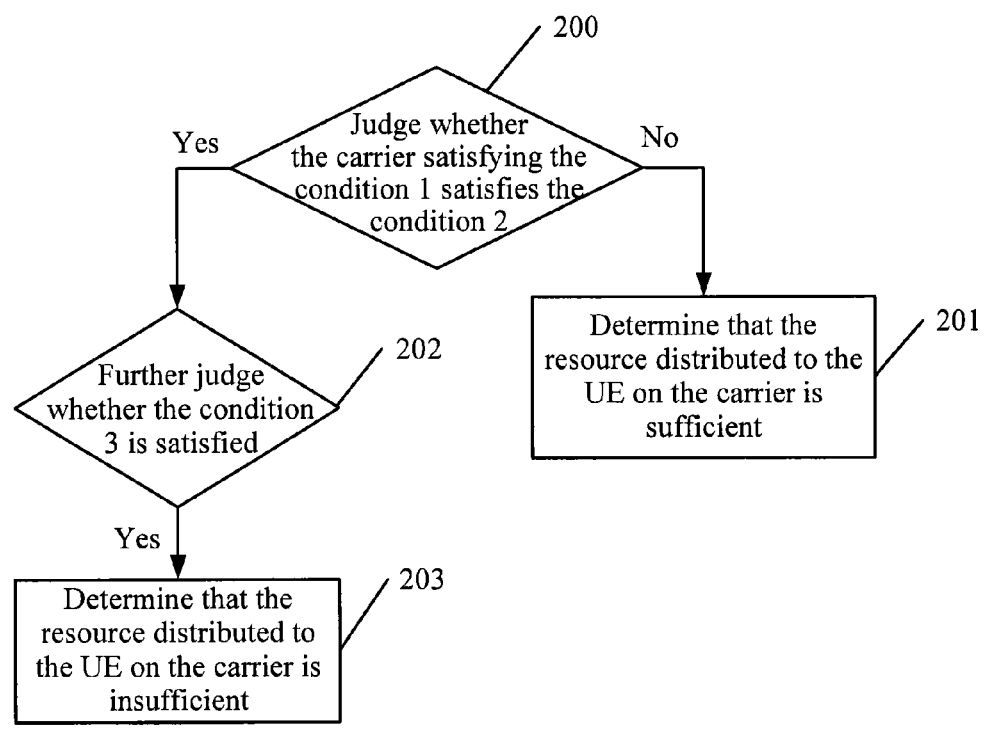
FIG. 2 is a schematic flow chart of another embodiment of a method for determining a resource according to the present invention.

Referring to FIG. 2, it is a schematic flow chart of another embodiment of a method for determining a resource according to the present invention. In this embodiment, it is presumed that it is judged whether the condition 1 is satisfied before it is judged whether the dual carriers satisfy the condition 2, one carrier of the dual carriers does not satisfy the condition 1, and the other one carrier satisfies the condition 1. As for the carrier not satisfying the condition 1, it is determined that the resource distributed on the carrier is sufficient; and therefore it is unnecessary to judge whether the condition 2 is satisfied.

Step 200: It is necessary to judge whether the carrier satisfying the condition 1 satisfies the condition 2 (it is judged whether the condition 2 is satisfied), that is, it is judged whether a UE has a sufficient transmission power to improve a data transmission rate on the carrier. Specifically, if a Medium Access Control (MAC)-i/is entity is configured at a network side, it is judged whether the transmission power of the UE allows transmitting additional 32 bits on the carrier; and if an MAC-e/es entity is configured at the network side, it is judged whether the transmission power of the UE allows transmitting an additional minimum RLC PDU on the carrier. If the carrier does not satisfy the condition 2, step 201 is performed; and if the carrier satisfies the condition 2, step 202 is performed.

It should be noted that, the MAC-i/is and the MAC-e/es are two MAC entities, the differences are that formats of RLC PDUs supported by the two MAC entities are different, the length of the RLC PDU supported by the MAC-i/is changeable, and the length of the RLC PDU supported by the MAC-e/es is fixed.

Step 201: Determine that the resource distributed to the UE on the carrier is sufficient.

Step 202: Judge whether the condition 3 is satisfied, and only the three conditions are simultaneously satisfied, step 203 is performed.

Step 203: Determine that the resource distributed to the UE on the carrier is insufficient.

Figure 3:
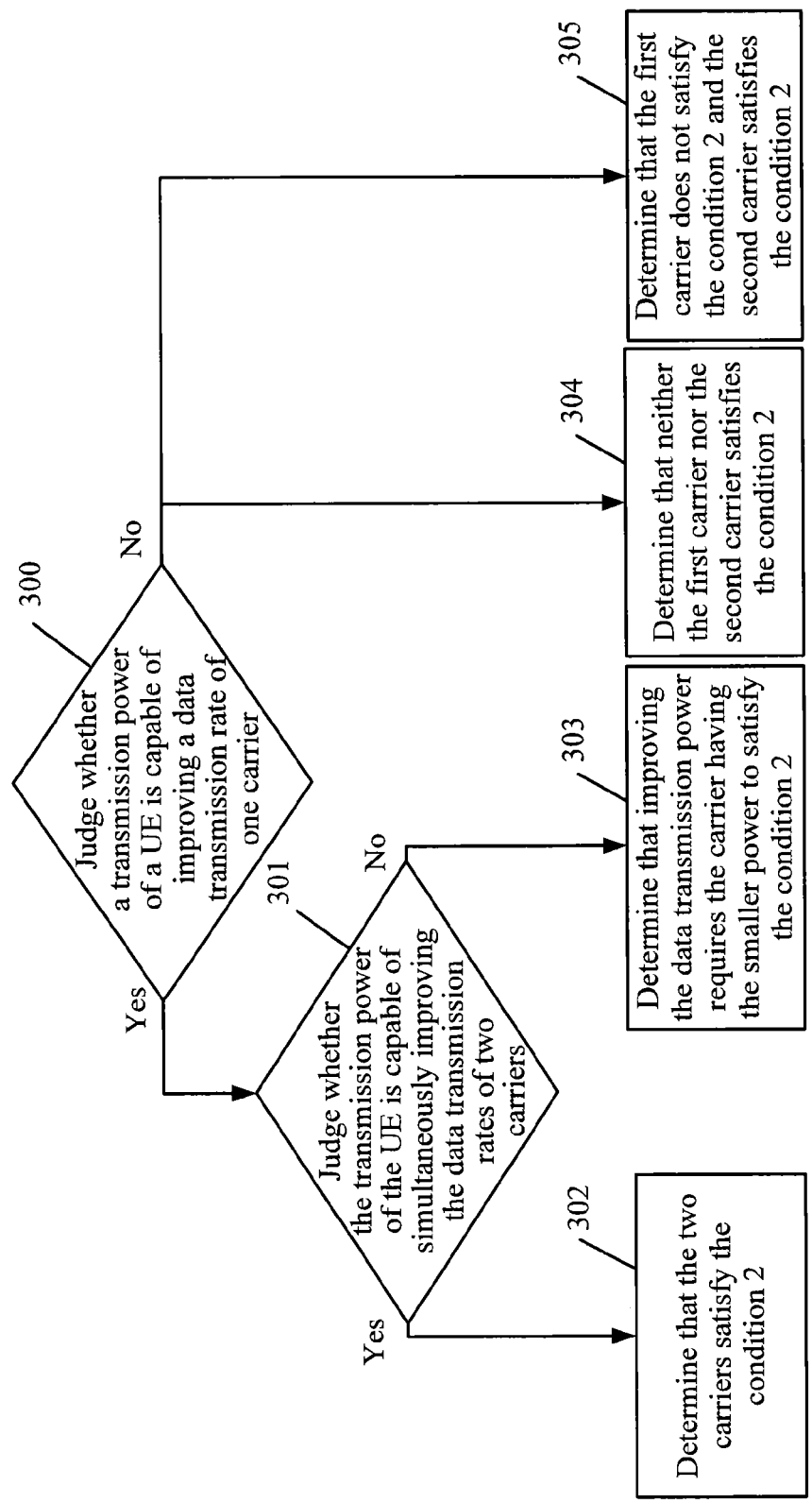
FIG. 3 is a schematic flow chart of still another embodiment of a method for determining a resource according to the present invention.

Referring to FIG. 3, it is a schematic flow chart of still another embodiment of a method for determining a resource according to the present invention. In this embodiment, if two carriers of dual carriers satisfy the condition 1, it is judged respectively whether the two carriers satisfy the condition 2.

Step 300: Respectively presume that a power of one carrier is unchanged, and judge whether a transmission power of a UE is capable of improving a data transmission rate of the other one carrier. Specifically, if an MAC-e/es entity is configured at a network side, it is judged whether the transmission power of the UE allows transmitting an additional minimum RLC PDU on the carrier, and if an MAC-i/is configured at the network side, it is judged whether the transmission power of the UE allows transmitting additional 32 bits.

Specifically, a power of a first carrier of the dual carriers is fixed, and it is judged whether the transmission power of the UE is capable of improving a data transmission rate of a second carrier; and a power of the second carrier of the dual carriers is fixed, and it is judged whether the transmission power of the UE is capable of improving a data transmission rate of the first carrier.

In Step 300, if the transmission power of the UE is capable of improving the data transmission rate of the second carrier when the power of the first carrier is fixed, and if the transmission power of the UE is capable of improving the data transmission rate of the first carrier when the power of the second carrier is fixed, step 301 is performed.

In Step 300, if it is judged that the transmission power of the UE is not capable of improving the data transmission rate of the second carrier when the power of the first carrier is fixed, and if it is judged that the transmission power of the UE is not capable of improving the data transmission rate of the first carrier when the power of the second carrier of the dual carriers is fixed, step 304 is performed.

In Step 300, if it is judged that the transmission power of the UE is not capable of improving the data transmission rate of the second carrier when the power of the first carrier of the dual carriers is fixed, and if it is judged that the transmission power of the UE is capable of improving the data transmission rate of the first carrier when the power of the second carrier is fixed, step 305 is performed.

Step 301: Judge whether the transmission power of the UE is capable of simultaneously improving the data transmission rate of the first carrier and the data transmission rate of the second carrier. If the judgment result of step 301 is that the transmission power of the UE is capable of simultaneously improving the data transmission rate of the first carrier and the data transmission rate of the second carrier, step 302 is performed; otherwise, Step 303 is performed.

Step 302: Determine that the two carriers satisfy the condition 2, that is, determine that the transmission power of the UE is capable of improving the data transmission rate of the first carrier, and determine that the transmission power of the UE is capable of improving the data transmission rate of the second carrier.

Step 303: Determine that the improving the data transmission rate requires the carrier having the smaller power to satisfy the condition 2. Specifically, if an MAC-e/es entity is configured at a network side, it is determined that the additionally transmitting a minimum RLC PDU requires the carrier having the smaller power to satisfy the condition 2; and if an MAC-i/is configured at the network side, the additionally transmitting 32 bits requires the carrier having smaller power to satisfy the condition 2.

Step 304: Determine that neither the first carrier nor the second carrier satisfies the condition 2, that is, determine that the resource distributed to the UE on the first carrier and the second carrier is sufficient.

Step 305: Determine that the first carrier does not satisfy the condition 2, that is, determine that the resource distributed to the UE on the first carrier is sufficient; and determine that the second carrier satisfies the condition 2.

When it is judged whether the condition 2 is satisfied, the UE performs the following operations.

If the MAC-i/is configured at the network side, the UE judges whether the E-TFC has a transmission block having the size being at least 32 bits larger than the size of a transmission block selected by the E-TFC in a Transmission Time Interval (TTI) to which a resource Happy Bit belongs; and if the MAC-e/es is configured, the UE judges whether the E-TFC has a transmission block having the size being at least x bits larger than the size of the transmission block selected by the E-TFC in the TTI to which the resource Happy Bit belongs, in which x indicates a minimum RLC PDU size configured in all logic channels having data and not belonging to a non-scheduling MAC-d flow in a buffer.

The Happy Bit is a single bit, and has two values "Happy" and "Unhappy", which represent whether the UE is satisfied with the resource distributed to the UE itself by a Node B, that is, whether the resource distributed on the corresponding carrier is sufficient. The Happy Bit exists in an uplink E-DCH Dedicated Physical Control Channel (E-DPCCH) of each TTI.

The UE detects whether a status of the E-TFC is "support" according to a power offset used by the E-TFC in the TTI to which the Happy Bit belongs when selecting the transmission data.

The detecting the E-TFC to be the "support" status requires to satisfy the following conditions:

a channelization code required by the E-TFC is in a span of a maximum channelization code of an E-DCH Dedicated Physical Data Channel (E-DPDCH); and the power of the UE can support the E-TFC.

According to the method for determining a resource of the embodiment of the present invention, when it is judged whether the dual carriers satisfy the condition 2, various possible solutions are provided, so as to exclusively determine whether the resource distributed to the UE on the dual carriers is sufficient, so that a base station distributes the resource for one or two carriers having the insufficient resource of the dual carriers according to the judgment result, so as to improve a network transmission performance.

When it is judged whether the dual carriers satisfy the condition 3, the following situations exist. Firstly, it is directly judged whether the condition 3 is satisfied; secondly, it is judged whether the condition 1 is satisfied first; and thirdly, it is judged whether the condition 2 is satisfied first. In the following embodiment, it is presumed that it is directly judged whether the condition 3 is satisfied.

Figure 4:
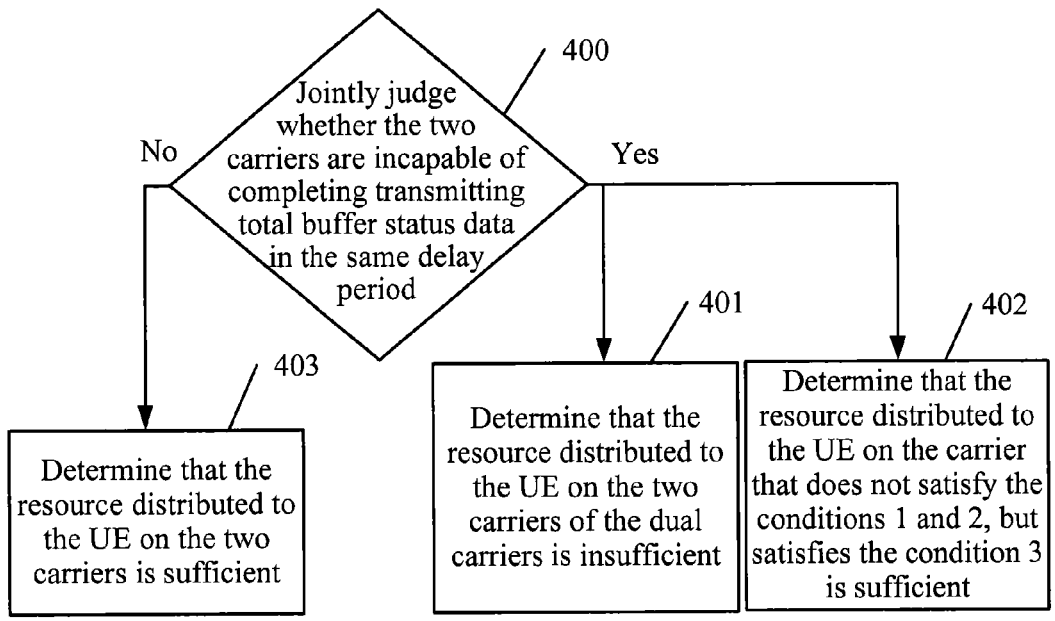
FIG. 4 is a schematic flow chart of yet another embodiment of a method for determining a resource according to the present invention.

Referring to FIG. 4, it is a schematic flow chart of yet another embodiment of a method for determining a resource according to the present invention. In the embodiment of the present invention, it is simultaneously judged whether two carriers of dual carriers satisfy condition 3, that is, in step 400, it is jointly judged whether the two carriers are incapable of completing transmitting total buffer status data in the same delay period.

Specifically, it is judged whether the two carriers are incapable of completing transmitting Total E-DCH Buffer Status (TEBS) data in a resource Happy_Bit_Delay_Condition time (the same Happy_Bit_Delay_Condition is used by the two carriers). The Happy_Bit_Delay_Condition is a Happy Bit delay time configured for an MAC by Radio Resource Control (RRC).

In MAC-e/MAC-i, two carriers share a buffer, that is, are corresponding to a TEBS. Therefore, when it is judged whether the condition 3 is satisfied, each carrier of the dual carriers uses the power offset used to transmit data and selected by the E-TFC in the same TTI during which the Happy Bit is transmitted. It is judged whether all data of the TEBS can be transmitted in the Happy_Bit_Delay_Condition time according to a product result between current SG of each carrier and a proportion of an activation process in all processes (under a situation of 10 ms TTI, the proportion of the activation process is 1:1).

If the dual carriers satisfies the condition 3, and it is determined that the dual carriers satisfy conditions 1 and 2 before, step 401 is performed; if the dual carriers satisfy the condition 3, and it is determined that one carrier of the dual carriers does not satisfy the conditions 1 and 2 before, step 402 is performed; and if the dual carriers do not satisfy the condition 3, step 403 is performed.

Step 401: It is determined that a resource distributed to the UE on the two carriers of the dual carriers is insufficient.

Step 402: It is determined that the resource distributed to the UE on a carrier that does not satisfy the conditions 1 and 2, but satisfies the condition 3 is sufficient.

Step 403: It is determined that the resource distributed to the UE on the two carriers of the dual carriers is sufficient.

According to the method for determining a resource of the embodiment of the present invention, when it is judged whether the dual carriers satisfy the condition 3, various possible solutions are provided, so as to exclusively determine whether the resource distributed to the UE on the dual carriers is sufficient, so that a base station distributes the resource for one or two carriers having the insufficient resource of the dual carriers according to the judgment result, so as to improve a network transmission performance.

Based on the methods for determining a resource according to the foregoing embodiments, an embodiment of the present invention further provides a method for reporting a resource, which includes:

determining that a resource distributed to a UE on one carrier of dual carriers of the UE is insufficient, if transmission data on the carrier reaches the maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient; and reporting to a base station whether the resource distributed on the dual carriers is sufficient.

Figure 5:
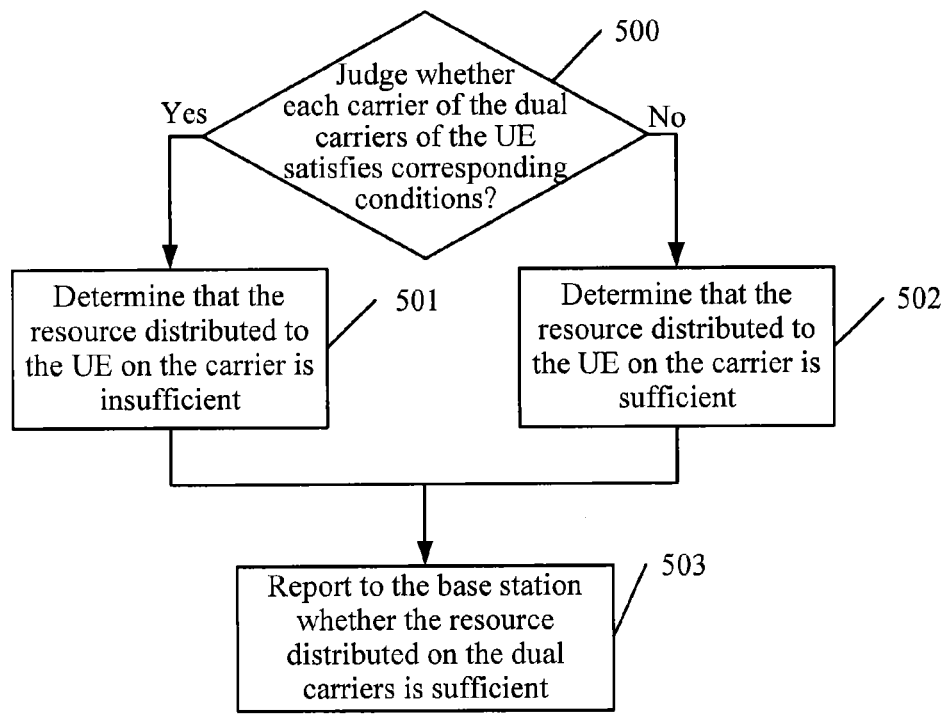
FIG. 5 is a schematic flow chart of an embodiment of a method for reporting a resource according to the present invention.

Referring to FIG. 5, a specific flow includes the following content.

Step 500: Judge whether each carrier of the dual carriers of the UE satisfies the following conditions:

the transmission data on the carrier reaches maximum transmission data supported in the scope allowed by the SG;

the transmission power of the UE is capable of improving the data transmission rate of the carrier; and the carrier and the other one carrier of the dual carriers are incapable of completing transmitting the total buffer status data in the same delay period.

If one carrier of the dual carriers simultaneously satisfies the above conditions, step 501 is performed; and if one carrier of the dual carriers does not simultaneously satisfy the above conditions, step 502 is performed.

Step 501: Determine that the resource distributed to the UE on the carrier is insufficient.

Step 502: Determine that the resource distributed to the UE on the carrier is sufficient.

Step 503: Report to the base station whether the resource distributed on the dual carriers is sufficient.

The UE may report to the base station a situation of whether the resource distributed on the dual carriers is sufficient by carrying the situation in a Happy Bit. Optionally, the situation of whether the resource distributed on each carrier of the dual carriers is sufficient may be carried in two Happy Bits and reported to the base station, or a situation of whether the resource respectively distributed on the two carriers is sufficient is carried in one Happy Bit.

According to the method for reporting a resource of the embodiment of the present invention, a solution for determining whether the resource distributed on the dual carriers is sufficient and reporting the judgment result to the base station is provided, so as to exclusively determine whether the resource distributed to the UE on the dual carriers is sufficient, so that the base station distributes the resource for one or two carriers having the insufficient resource of the dual carriers according to the judgment result, so as to improve a network transmission performance.

Figure 6:
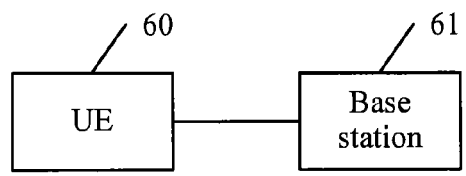
FIG. 6 is a schematic structural diagram of an embodiment of a system for distributing a resource according to the present invention.

Referring to FIG. 6, it is a schematic structural diagram of an embodiment of a system for distributing a resource according to the present invention. The system of this embodiment includes a UE 60 and a base station 61.

The UE 60 is configured to judge whether the resource distributed to the UE 60 on each carrier of dual carriers is sufficient, and report to the base station 61 whether the resource distributed on the dual carriers is sufficient; and the base station 61 is configured to distribute a resource for a corresponding carrier according to content reported by the UE 60.

Specifically, conditions for judging whether the resource distributed to the UE 60 on each carrier is sufficient are as follows:

transmission data on the carrier reaches maximum transmission data supported in a scope allowed by SG;

a transmission power of the UE is capable of improving a data transmission rate of the carrier; and the carrier and the other one carrier of the dual carriers are incapable of completing transmitting total buffer status data in the same delay period.

If one carrier of the dual carriers simultaneously satisfies the conditions, it is determined that the resource distributed to the UE 60 on the carrier is insufficient; and if one carrier of the dual carriers does not simultaneously satisfy the conditions, it is determined that the resource distributed to the UE 60 on the carrier is sufficient.

Optionally, the UE 60 reports to the base station 61 a determination result of whether the resource distributed on the dual carriers is sufficient by carrying the result in a Happy Bit. Optionally, the UE 60 may report to the base station 61 a situation of whether the resource distributed on each carrier of the dual carriers is sufficient by carrying the situation in two Happy Bits, or may report to the base station 61 a situation of whether the resource respectively distributed on the two carriers is sufficient by carrying the situation in one Happy Bit.

The Happy Bit is a single bit, and has two values "Happy" and "Unhappy", which represent whether the UE is satisfied with the resource distributed to the UE itself by a Node B, that is, whether a resource distributed on a corresponding carrier is sufficient. The Happy Bit exists in transmission of an uplink E-DPCCH of each TTI.

It should be noted that, in the same TTI, an E-DPDCH transmits user data, and the E-DPCCH transmits corresponding control information. The content transmitted by the uplink E-DPCCH is as follows:

Retransmission Sequence Number (RSN): 2 bit

E-TFCI: 7 Bit

Happy Bit: 1 bit, for example, "Happy" is 1, and "Unhappy" is 0; or "Happy" is 0, and "Unhappy" is 1.

According to the system for distributing a resource of the embodiment of the present invention, a solution determining whether the resource distributed on the dual carriers is sufficient and reporting the determination result to the base station is provided, so as to exclusively determine whether the resource distributed to the UE on the dual carriers is sufficient, so that the base station distributes the resource for one or two carriers having the insufficient resource of the dual carriers according to the determination result, so as to improve a network transmission performance.

Figure 7:
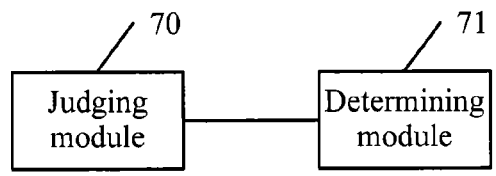
FIG. 7 is a schematic structural diagram of an embodiment of a UE according to the present invention.

Referring to FIG. 7, it is a schematic structural diagram of an embodiment of a UE according to the present invention. The UE of this embodiment includes a judging module 70 and a determining module 71.

The judging module 70 is configured to respectively judge whether transmission data on each carrier of dual carriers of the UE reaches maximum transmission data supported in a scope allowed by SG, respectively judge whether a transmission power of the UE is capable of improving a data transmission rate of each carrier of the dual carriers, and jointly judge whether each carrier of the dual carriers is incapable of completing transmitting total buffer status data in the same delay period.

The determining module 71 is configured to determine that a resource distributed to the UE on one carrier of the dual carriers of the UE is insufficient, if a judgment result of the judging module 70 is that transmission data on the carrier reaches the maximum transmission data supported in the scope allowed by the SG, the transmission power of the UE is capable of improving the data transmission rate of the carrier, and the carrier and the other one carrier of the dual carriers are incapable of completing transmitting the total buffer status data in the same delay period; otherwise, determine that the resource distributed for the UE on the carrier is sufficient.

In specific implementation, three judgments performed by the judging module 70 have no precedence order, and as long as one judgment result is no, the determining module 71 determines that the resource distributed to the UE on the carrier is sufficient; and only the judgment results of the three judgments are yes, the determining module 71 determines that the resource distributed to the UE on the carrier is insufficient.

The UE according to the embodiment of the present invention may determine whether the resource distributed to the UE on the dual carriers is sufficient, so as to enable a base station to distribute a resource for one or two carriers having the insufficient resource of the dual carriers according to the determination result, so as to improve a network transmission performance.

Figure 8:
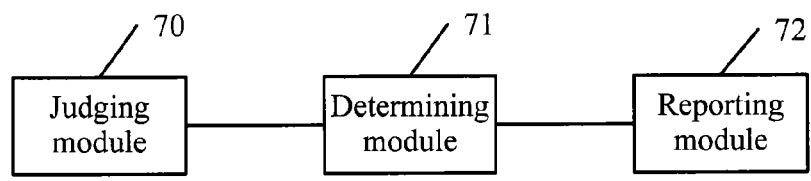
FIG. 8 is a schematic structural diagram of another embodiment of a UE according to the present invention.

Referring FIG. 8, it is a schematic structural diagram of another embodiment of a UE according to the present invention. In addition to the same structure and functions of the UE shown in the previous embodiment and FIG. 7, the UE of this embodiment further includes a reporting module 72, configured to report to a base station whether a resource distributed on dual carriers is sufficient.

Specifically, the UE reports to the base station a situation of whether the resource distributed on the dual carriers is sufficient by carrying the situation in a Happy Bit. Optionally, the situation of whether the resource distributed on each carrier of the dual carriers is sufficient may be carried in two Happy Bits and reported to the base station, or a situation of whether the resource respectively distributed on the two carriers is sufficient is carried in one Happy Bit.

The UE according to the embodiment of the present invention may exclusively determine whether the resource distributed to the UE on the dual carriers is sufficient, and may report the judgment result to the base station through the reporting module, so as to enable the base station to distribute the resource for one or two carriers having the insufficient resource of the dual carriers according to the determination result, so as to improve a network transmission performance.

Figure 9:
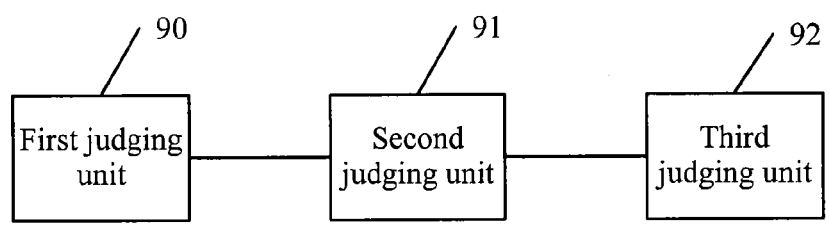
FIG. 9 is a schematic structural diagram of still another embodiment of a UE according to the present invention.

Referring to FIG. 9, it is a schematic structural diagram of still another embodiment of a UE according to the present invention. In this embodiment, a structure and functions of a judging module of the UE are described in detail, and the judging module includes a first judging unit 90, a second judging unit 91, and a third judging unit 92.

The first judging unit 90 is configured to respectively judge whether transmission data on each carrier of dual carriers of the UE reaches maximum transmission data supported in a scope allowed by SG. The second judging unit 91 is configured to respectively judge whether a transmission power of the UE is capable of improving a data transmission rate of each carrier of the dual carriers. The third judging unit 92 is configured to jointly judge whether each carrier of the dual carriers is capable of completing transmitting total buffer status data in the same delay period.

It should be noted that, in specific implementation of the three judging units, judgments for each carrier have no precedence order, and not each carrier needs to be judged once. Specifically, the first judging unit 90 may judge the dual carriers first (respectively judge each carrier of the dual carriers), or the second judging unit 91 may judge the dual carriers first (respectively judge each carrier of the dual carriers), or the third judging unit 92 may judge the dual carriers first (jointly judge each carrier of the dual carriers). As long as one judgment result of the first judging unit and the second judging unit is yes, or a judgment result of the third judging unit is no, a determining module determines that the resource distributed to the UE on the carrier is sufficient. When the judgment results of the first judging unit and the second judging unit are simultaneously yes, and the judgment result of the third judging unit is no, the determining module determines that the resource distributed to the UE on the carrier is insufficient.

The UE according to the embodiment of the present invention may flexibly determine whether the resource distributed to the UE on the dual carriers is sufficient, so as to enable a base station to distribute the resource for one or two carriers having the insufficient resource of the dual carriers according to the determination result, so as to improve a network transmission performance.

Through the above description of the embodiments, it is apparent to those skilled in the art that the present invention may be implemented by software on a necessary universal hardware platform, and definitely may also be implemented by hardware. Based on such understandings, all or part of the technical solution under the present invention that makes contributions to the prior art may be essentially embodied in the form of a software product. The software product may be stored in a storage medium, which can be a Read-Only Memory (ROM), a Random Access Memory (RAM), a magnetic disk, or an optical disk. The software product includes a number of instructions that enable a computer device (personal computer, server, or network device) to execute the methods according to the embodiments of the present invention.

The above descriptions are merely exemplary embodiments of the present invention, but not intended to limit the scope of the present invention. Any equivalent variation made according to the claims of the present invention shall fall within the scope of the present invention.

What is claimed is:

1. A method implemented in a user equipment (UE) configured with multiple carriers, the method comprising:
   determining, by the UE, whether a first condition is met on a carrier of the multiple carriers, the first condition indicating that transmission data on the carrier reaches maximum transmission data allowed by a current service grant (SG) on the carrier;
   determining, by the UE, whether a second condition is met on the carrier, the second condition indicating that the UE has enough transmission power available to improve a data transmission rate on the carrier;
   determining, by the UE, whether a third condition is met, the third condition indicating that the carrier together with at least one of other carriers from the multiple carriers, with a product of the current SG and a ratio of active processes to a total number of processes on the carrier plus a product of a current SG and a ratio of active processes to a total number of processes on each of the at least one of the other carriers, are incapable of finishing transmission of total buffer status data in a configured time period; and
   determining, by the UE, that resource allocated to the UE on the carrier is insufficient in a situation where the first, second, and third conditions are met.

2. The method of claim 1, further comprising:
   notifying, by the UE, a base station that the resource allocated to the UE on the carrier is insufficient.

3. The method of claim 1, further comprising:
   determining, by the UE, that the resource allocated to the UE on the carrier is sufficient in a situation where any of the first, second, and third conditions is not met.

4. The method of claim 3, further comprising:
   notifying, by the UE, a base station that the resource allocated to the UE on the carrier is sufficient when determining that the resource allocated to the UE on the carrier is sufficient.

5. The method of claim 1, wherein the number of the multiple carriers is two.

6. A user equipment (UE) configured with multiple carriers, the UE comprising:
   a judging module; and
   a determining module communicatively connect with the judging module,
   wherein the judging module is configured to determine;
      whether a first condition is met on a carrier of the multiple carriers, the first condition indicating that transmission data on the carrier reaches maximum transmission data allowed by a current service grant (SG) on the carrier;
      whether a second condition is met on the carrier, the second condition indicating that the UE has enough transmission power available to improve a data transmission rate on the carrier; and
      whether a third condition is met, the third condition indicating that the carrier together with at least one of other carriers from the multiple carriers, with a product of the current SG and a ratio of active processes to a total number of processes on the carrier plus a product of a current SG and a ratio of active processes to a total number of processes on each of the at least one of the other carriers, are incapable of finishing transmission of total buffer status data in a configured time period, and
   wherein the determining module is configured to determine that resource allocated to the UE on the carrier is insufficient in a situation where the first, second, and third conditions are met.

7. The UE of claim 6, further comprising:
   a reporting module configured to report to a base station that the resource allocated to the UE on the carrier is insufficient.

8. The UE of claim 6, wherein the determining module is further configured to determine that the resource allocated to the UE on the carrier is sufficient in a situation where any of the first, second, and third conditions is not met.

9. The UE of claim 8, further comprising:
   a reporting module configured to report to a base station that the resource allocated to the UE on the carrier is insufficient when it is determined that the resource allocated to the UE on the carrier is sufficient, and to report to the base station that the resource allocated to the UE on the carrier is sufficient when it is determined that the resource allocated to the UE on the carrier is sufficient.

10. The UE of claim 6, wherein the number of the multiple carriers is two.

11. A communication system, comprising:
a user equipment (UE) configured with multiple carriers and being capable of communicatively connect to a base station,
wherein the UE is configured to:
determine whether a first condition is met on a carrier of the multiple carriers, the first condition indicating that transmission data on a carrier reaches maximum transmission data allowed by a current service grant (SG) on the carrier;
determine whether a second condition is met on the carrier, the second condition indicating that the UE has enough transmission power available to improve a data transmission rate on the carrier;
determine whether a third condition is met, the third condition indicating that the carrier together with at least one of other carriers from the multiple carriers, with a product of the current SG and a ratio of active processes to a total number of processes on the carrier plus a product of a current SG and a ratio of active processes to a total number of processes on each of the at least one of the other carriers, are incapable of finishing transmission of total buffer status data in a configured time period; and
determine that resource allocated to the UE on the carrier is insufficient in a situation where the first, second, and third conditions are met.

12. The system of claim 11, wherein the UE is further configured to notify a base station that the resource allocated to the UE on the carrier is insufficient.

13. The system of claim 11, wherein the UE is further configured to determine that the resource allocated to the UE on the carrier is sufficient in a situation where any of the first, second, and third conditions is not met.

14. The system of claim 13, wherein the UE is further configured to report to the base station that the resource allocated to the UE on the carrier is insufficient when determining that the resource allocated to the UE on the carrier is sufficient, and to report to the base station that the resource allocated to the UE on the carrier is sufficient when determining that the resource allocated to the UE on the carrier is sufficient.

15. The system of claim 11, wherein the number of the multiple carriers is two.

16. The method of claim 1, wherein in determining whether the second condition is met, in a situation where a Medium Access Control (MAC)-i/is configured, it is determined that the second condition is met on the carrier when transmission power of the UE allows transmission of additional 32 bits on the carrier; or in a situation where an MAC-e/es is configured, it is determined that the second condition is met on the carrier when the transmission power of the UE allows transmission of an additional minimum radio link control (RLC) packet data unit (PDU) on the carrier.

17. The UE of claim 6, wherein in determining whether the second condition is met on the carrier, in a satiation where a Medium Access Control (MAC)-i/is configured, the judging module is configured to determine that the second condition is met on the carrier when transmission power of the UE allows transmission of additional 32 bits on the carrier is met; or in a satiation where an MAC-e/es is configured, the judging module is configured to determine that the second condition is met on the carrier when the transmission power of the UE allows transmission of an additional minimum radio link control (RLC) packet data unit (PDU) on the carrier.

18. The system of claim 11, wherein in determining whether the second condition is met on the carrier, in a satiation where a Medium Access Control (MAC)-i/is configured, the UE is configured to determine that the second condition is met on the carrier when transmission power of the UE allows transmission of additional 32 bits on the carrier; or in a satiation where an MAC-e/es is configured, the UE is configured to determine that second condition is met on the carrier when the transmission power of the UE allows transmission of an additional minimum radio link control (RLC) packet data unit (PDU) on the carrier.

* * * * *